(12) United States Patent
McIntyre et al.

(10) Patent No.: US 6,793,322 B1
(45) Date of Patent: Sep. 21, 2004

(54) METHOD OF PRINTING MULTI-COLOR IMAGE

(75) Inventors: Dale F. McIntyre, Honeoye Falls, NY (US); Loretta E. Allen, Hilton, NY (US); David L. Patton, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/438,598

(22) Filed: May 15, 2003

(51) Int. Cl.$^7$ ................................. B41J 2/21; B41J 2/17
(52) U.S. Cl. ................................. 347/43; 347/98
(58) Field of Search .................. 347/43, 15, 19, 347/21, 98

(56) References Cited

U.S. PATENT DOCUMENTS

| | | | | |
|---|---|---|---|---|
| 2,420,336 | A | | 5/1947 | Orchard .................... 8/457 |
| 5,182,571 | A | * | 1/1993 | Creagh et al. .............. 347/105 |
| 5,552,811 | A | | 9/1996 | Kurata et al. ............... 347/28 |
| 5,839,837 | A | * | 11/1998 | Takehara .................... 400/76 |
| 5,966,150 | A | * | 10/1999 | Lester et al. ................ 347/43 |
| 6,227,643 | B1 | | 5/2001 | Purcell et al. .............. 347/19 |
| 6,344,819 | B1 | | 2/2002 | Pond ........................ 342/100 |
| 6,464,336 | B1 | | 10/2002 | Sharma ..................... 347/43 |
| 6,533,382 | B1 | * | 3/2003 | Tomida et al. .............. 347/15 |

* cited by examiner

*Primary Examiner*—Thinh Nguyen
(74) *Attorney, Agent, or Firm*—Roger A. Fields

(57) ABSTRACT

A method of printing a multi-color image on a particular surface, using a digital image file having a discrete number of pixels that collectively represent the multi-color image, comprises: determining a relatively large area of the multi-color image that is represented by less than the total number of pixels, but which pixels each have a common printing color component; forming an outline of the determined relatively large image area on the particular surface the multi-colored image is to be printed; providing a colored receiver layer within the formed outline that is the same color as the common color component, but which color has a selected low color value; applying a non-colored receiver to an area on the particular surface that is outside the formed outline on the particular surface, to provide a non-colored receiver layer on the particular surface in addition to the colored receiver layer on the particular surface; modifying the digital image file by subtracting the selected low color value from the pixels representing the relatively large area, to provide a printing file for printing the multicolor image; and printing the multi-color image on the colored and non-colored receiver layers, using the printing file, to make a print of the multicolor image on the particular surface.

5 Claims, 3 Drawing Sheets

METHOD OF PRINTING MULTI-COLOR IMAGE

FIELD OF THE INVENTION

The invention relates generally to printing multi-color images, and in particular to printing large size images preferably using an ink jet printer.

BACKGROUND OF THE INVENTION

Typically, color ink jet printing is done on a non-colored surface or media such as white paper. Of course, however, the printing can be done on a colored surface or media, such as colored paper. In either instance, a full compliment of the various color printing inks, e.g. cyan, magenta and yellow inks are used. Moreover, the various color printing inks are applied pixel-by-pixel to the selected surface.

When the selected surface originally is colored rather than white, the color of the surface generally bears no relation to the color of the inks to be applied to that surface. Thus, the color of the selected surface does not reduce the amount of inks to be applied, nor does it reduce the time required to apply the inks.

Prior art U.S. Pat. No. 6,227,643 B1 issued May 8, 2001 briefly mentions that, preparatory to ink jet printing, information is obtained which is indicative of an original color of the selected surface to which the inks are to be applied. This is done in order to modify the digital printing file to correct for any color aberrations caused by the original color of the selected surface.

SUMMARY OF THE INVENTION

A method of printing a multi-color image on a particular surface, using a digital image file having a discrete number of pixels that collectively represent the multi-color image, said method comprising:

determining a relatively large area of the multi-color image that is represented by less than the total number of pixels, but which pixels each have a common printing color component;

forming an outline of the determined relatively large image area on the particular surface the multi-colored image is to be printed;

providing a colored receiver layer within the formed outline that is the same color as the common color component, but which color has a selected low color value;

applying a non-colored receiver to an area on the particular surface that is outside the formed outline on the particular surface, to provide a non-colored receiver layer on the particular surface in addition to the colored receiver layer on the particular surface;

modifying the digital image file by subtracting the selected low color value from the pixels representing the relatively large area, to provide a printing file for printing the multi-color image; and printing the multi-color image on the colored and non-colored receiver layers, using the printing file, to make a print of the multi-color image on the particular surface.

DETAILED DESCRIPTION OF THE INVENTION

The invention is a method of printing a multi-color image on a particular or selected surface, for example printing a large size image on an opaque wall, using a digital image file having a discrete number of pixels that collectively represent the multi-color image. The digital image file can be produced by any one of a number of known ways. For example, it can be produced by scanning a multi-color image that exists as printed matter or as a film negative or positive, it can be produced from a captured image in a digital camera, it can be produced from a computer image on a liquid crystal display, etc. Moreover, the image printing is done preferably using an ink jet printer that has cyan, magenta and yellow inks.

Figure 1:
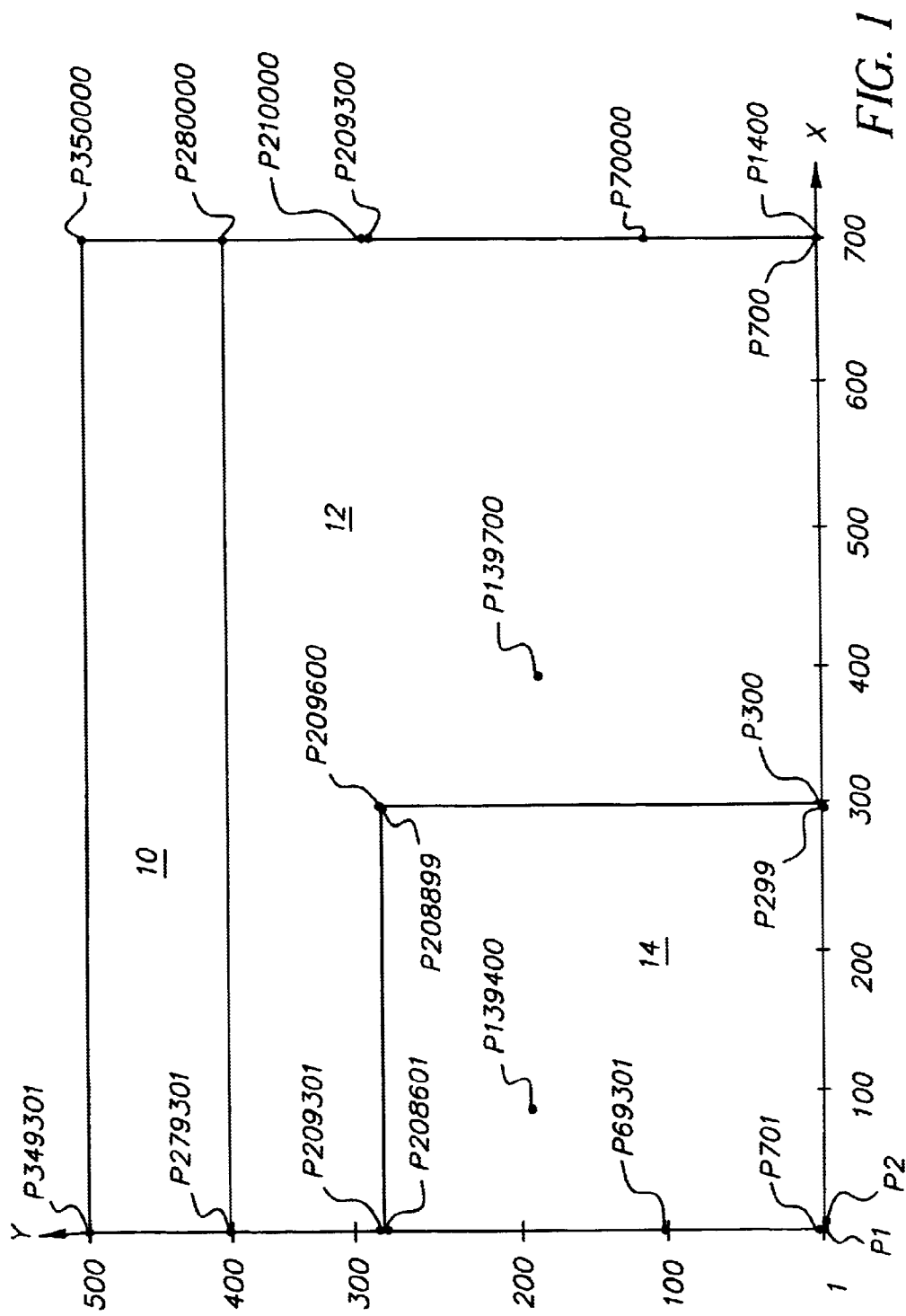
FIG. 1 depicts an X axis, Y axis pattern of pixels that collectively represent a multi-color image to be printed on a selected surface.

The digital image file representing the multi-color image may, for example, have 350,000 pixels, i.e. pixels P1–P350000, arranged in an X axis, Y axis pattern of 700 pixels×500 pixels as depicted in FIG. 1. The X axis, Y axis pixel pattern permits an assignment of X,Y coordinates to each pixel, so that the location of each pixel can be readily determined in the context of the multi-color image according to a known methodology. Thus, as shown in FIG. 1, by way of example, the pixel P1 would have the X,Y coordinates 1,1, the pixel P2 would have the X,Y coordinates 2,1, the pixel P299 would have the X,Y coordinates 299,1, the pixel P300 would have the X,Y coordinates 300,1, the pixel P700 would have the X,Y coordinates 700,1, the pixel P701 would have the X,Y coordinates 1,2, the pixel P1400 would have the X,Y coordinates 700,2, the pixel P70000 would have the X,Y coordinates 700,100, the pixel P209300 would have the X,Y coordinates 700,299, the pixel P210000 would have the X,Y coordinates 700,300, the pixel P280000 would have the X,Y coordinates 700,400, the pixel P350000 would have the X,Y coordinates 700,500, the pixel P349301 would have the X,Y coordinates 1,500, the pixel P279301 would have the X,Y coordinates 1,400, the pixel P209301 would have the X,Y coordinates 1,300, the pixel P208601 would have the X,Y coordinates 1,299, the pixel P209600 would have the X,Y coordinates 300,300, the pixel P208899 would have the X,Y coordinates 299,299, the pixel P139400 would have the X,Y coordinates 100,200, the pixel P139700 would have the X,Y coordinates 400,200, and the pixel P69301 would have the X,Y coordinates 1,100. The X,Y coordinates of the remaining pixels can easily be extrapolated from FIG. 1.

Each one of the pixels P1–350000 can have a cyan (C) primary or printing color component and/or a magenta (M) primary or printing color component and/or a yellow (Y) primary or printing color component. In turn, each C, M and Y color component has an individual color value of 0–255.

Figure 2:
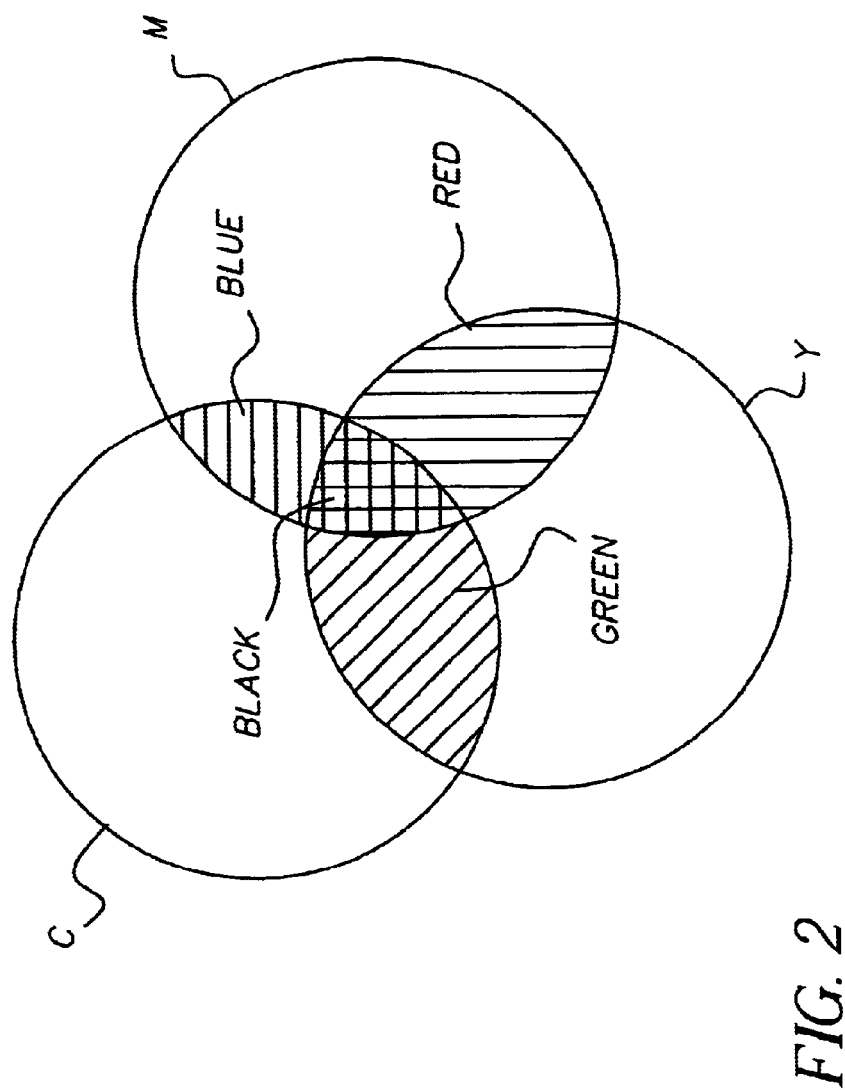
FIG. 2 is a cyan, magenta and yellow color mixing chart showing the mixing of these colors to produce red, green, blue and black.

As shown in FIG. 2, and is well known, mixing the C and M color components generally produces the color blue (BLUE). Mixing the C and Y color components generally produces the color green (GREEN). Mixing the M and Y color components generally produces the color red (RED). And mixing the C, M and Y color components substantially equally produces black (BLACK).

In FIG. 1, the pixels P279301–P350000 within an area 10 constitute generally blue sky, which at least for the most part is a mixture of C and M color components. The pixels within an area 12 constitute generally green grass, which at least for the most part is a mixture of C and Y color components. The pixels within a remaining area 14 constitute a generally-multi-colored composition such as two persons on a black tennis court, which is a mixture of C, M and Y color components.

A preferred embodiment of the method of printing a multi-color image consisting of the blue sky area 10, the green grass area 12, and the multi-colored composition or remaining area 14 in FIG. 1, on a particular or selected surface 16 such as a wall or a billboard, using the digital image file having the pixels P1–P350000, has the following steps.

STEPS 1–3

STEPS 1–3 involve analyzing the digital image file pixel-by-pixel as indicated in the TABLE which follows. However, for the sake of brevity, only a relatively small number of the pixels P1–P35000 are included in the TABLE. Thus, the TABLE only depicts a sample of the pixels P1–P350000.

TABLE

| Color Pixels (P1–P350000) | X, Y Pixel Coordinates | C, M, Y Color Values (0–255) Per Pixel | Dominant Color Component (C, M or Y) Per Pixel | Lowest Color Value Of Most Prevalent or Common Color Component > Threshold 100 | Resulting Printed Color |
|---|---|---|---|---|---|
| P1–P299 | 1, 1–299, 1 | 90, 90, 90 | None | | Black |
| P300 | 300, 1 | 110, 0, 100 | C | | Green |
| P700 | 700, 1 | 110, 0, 120 | Y | C = 110 | Green |
| P701 | 1, 2 | 80, 80, 80 | None | | Black |
| P1400 | 700, 2 | 120, 0, 110 | C | | Green |
| P139400 | 100, 200 | 80, 80, 80 | None | | Black |
| P139700 | 400, 200 | 130, 0, 120 | C | | Green |
| P208601 | 1, 299 | 0, 120, 110 | M | | Red |
| P208899 | 299, 299 | 0, 115, 110 | M | | Red |
| P209600 | 300, 300 | 110, 0, 105 | C | | Green |
| P209300 | 700, 299 | 110, 0, 120 | Y | C = 110 | Green |
| P210000 | 700, 300 | 125, 0, 120 | C | | Green |
| P209301 | 1, 300 | 130, 0, 120 | C | | Green |
| P279301 | 1, 400 | 150, 80, 0 | C | | Blue |
| P280000 | 700, 400 | 150, 80, 0 | C | | Blue |
| P349301 | 1, 500 | 120, 50, 0 | C | | Blue |
| P350000 | 700, 500 | 120, 100, 0 | C | | Blue |

As can be seen by viewing the TABLE, STEP 1 calls for reviewing the digital image file pixel-by-pixel, including a consideration of respective color values of the C, M and Y color components used to print the multi-colored image, to determine which color component C, M or Y is the dominant color component in each pixel. This is done in order to identify the most prevalent or common color component C, M or Y used in printing the multi-color image. For the pixels P1–P350000, the most prevalent color component is identified to be the C color component. This is because in FIG. 1 the C color component is used to print the blue sky and green grass areas 10 and 12.

In the TABLE, STEP 2 calls for interrogating the color values of the most prevalent color component, i.e. the C color component, pixel-by-pixel to identify a lowest color value of the most prevalent color component that exceeds a threshold color value, e.g. 100. The lowest color value is identified to be C=110.

In the TABLE, STEP 3 calls for identifying each pixel that has the most prevalent color component C, but with a color value of that color component that is greater than or equal to the identified lowest color value C=110, to determine a relatively large area of the multi-color image that corresponds to the identified pixels. The TABLE indicates that in FIG. 1 the blue sky and green grass areas 10 and 12 are the determined relatively large area, and it can be seen in FIG. 1 that those two areas in combination are substantially larger than the remaining area 14.

Figure 3:
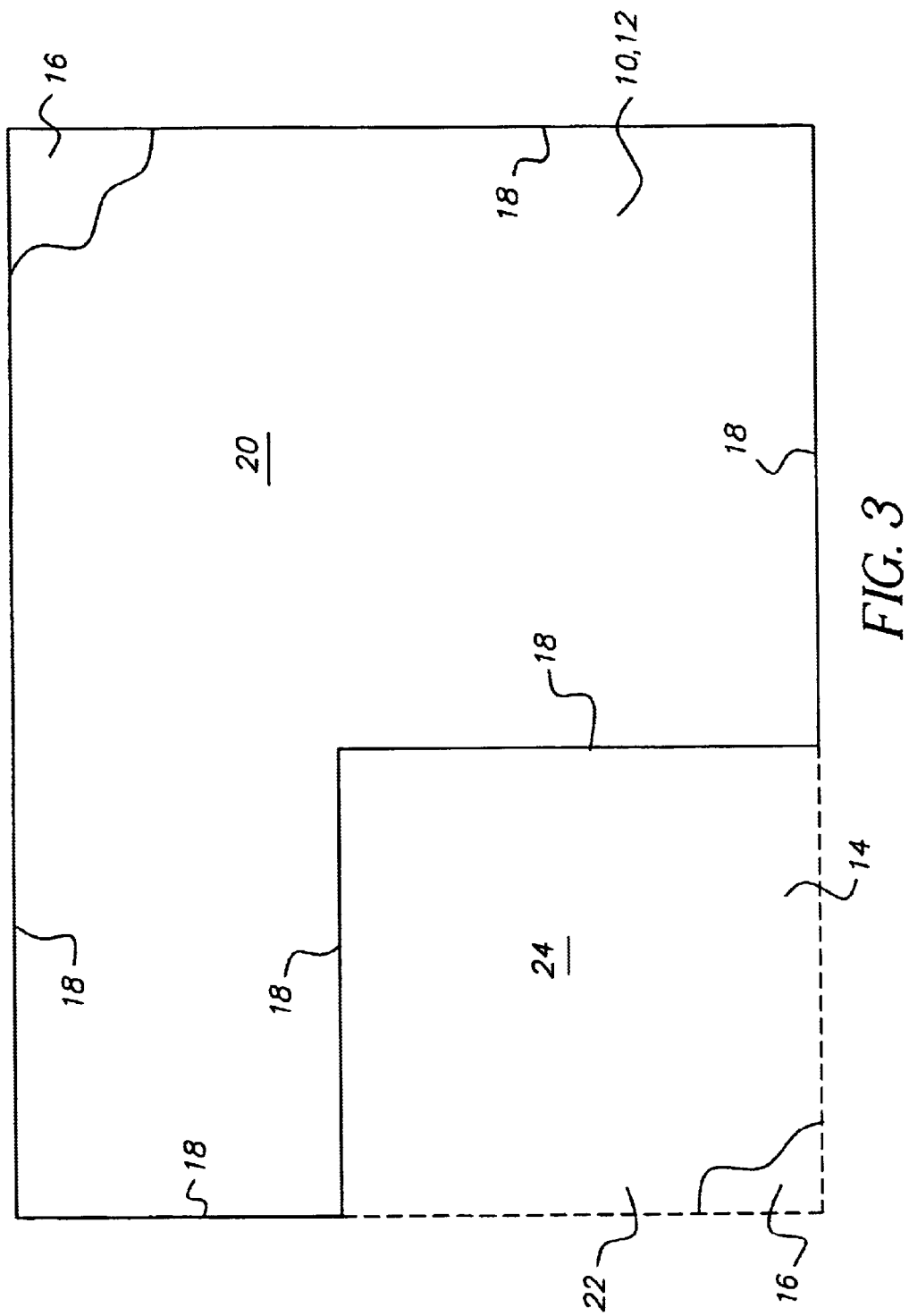
FIG. 3 depicts certain steps in a method of printing the multi-color image according to a preferred embodiment of the invention.

In FIG. 3 the determined relatively large area is designated by the reference numbers 10,12.

STEP 4

STEP 4 calls for forming an outline 18 of the determined relatively large image area 10,12 (which consists of the blue sky and the green grass areas 10 and 12) on the particular surface 16 the multi-colored image is to be printed. See FIG. 3. This can be readily done since the X,Y coordinates of the pixels P1–P350000 have been determined as indicated in the TABLE.

STEP 5

STEP 5 calls for applying a colored receiver having the identified lowest color value C=110 of the prevalent color component C within the formed outline 18 on the particular surface 16, to provide a colored receiver layer 20 within the formed outline that has the same color as the most prevalent color component. See FIG. 3. The C colored receiver with the color value C=110 may be an ink-compatible cyan color paint with the color value C=110. The paint can be hand-rolled or sprayed on the particular surface 16 (rather than a C color ink applied by pixel-by-pixel using an ink jet printer) within the formed outline 18.

STEP 6

STEP 6 calls for applying a non-colored receiver to a smaller area 22 on the particular surface 16 that is outside the formed outline 18 on the particular surface 16, to provide a non-colored receiver layer 24 on the particular surface in addition to the colored receiver layer 20 on the particular surface. See FIG. 3. The non-colored receiver may be an ink-compatible white paint that can be hand-rolled or sprayed on the particular surface 16 within the smaller area 22.

STEP 7

STEP 7 calls for modifying the digital image file by subtracting the identified lowest color value C=110 of the most prevalent color component C from the identified pixels that determine the relatively large area 10,12, to provide a printing file for printing the multi-color image. For example, the color values of the pixel P300 are changed from 110,0, 100 in the TABLE to 0,0,100, the color values of the pixel P700 are changed from 110,0,120 in the TABLE to 0,0,120, the color values of the pixel P 1400 are changed from 120,0,11 0 in the TABLE to 10,0,1 10, the color values of the pixel P139700 are changed from 130,0,120 in the TABLE to 20,0,120, the color values of the pixel P279301 are changed from 150,80,0 in the TABLE to 40,80,0, etc.

STEP 8

STEP 8 calls for cyan, magenta and yellow ink printing the multi-color image on the colored and non-colored receiver layers 20 and 24, using the printing file, i.e. the digital image file as modified in STEP 7, to make a print of the multi-color image on the particular surface 16. The various inks combine colorwise with the colored and non-colored receiver layers 20 and 24 to produce the various colors of the multi-color image.

The invention has been described in detail with particular reference to certain preferred embodiments thereof, but it

| PARTS LIST | |
|---|---|
| 10. | blue sky area |
| 12. | green grass area |
| 10, 12 | relatively large area |
| 14. | remaining area |
| 16. | particular or selected surface |
| 18. | outline |
| 20. | colored receiver layer |
| 22. | smaller area |
| 24. | non-colored receiver layer |

What is claimed is:

1. A method of printing a multi-color image on a particular surface, using a digital image file having a discrete number of pixels that collectively represent the multi-color image, said method comprising:

determining a relatively large area of the multi-color image that is represented by less than the total number of pixels, but which pixels each have a common printing color component;

forming an outline of the determined relatively large image area on the particular surface the multi-colored image is to be printed;

providing a colored receiver layer within the formed outline that is the same color as the common color component, but which color has a selected low color value;

applying a non-colored receiver to an area on the particular surface that is outside the formed outline on the particular surface, to provide a non-colored receiver layer on the particular surface in addition to the colored receiver layer on the particular surface;

modifying the digital image file by subtracting the selected low color value from the pixels representing the relatively large area, to provide a printing file for printing the multi-color image; and printing the multi-color image on the colored and non-colored receiver layers, using the printing file, to make a print of the multi-color image on the particular surface.

2. A method as recited in claim 1, wherein the step of determining a relatively large area of the multi-color image includes determining which color component is dominant in each pixel.

3. A method as recited in claim 1, wherein the selected low color value is found by interrogating the color values of the common color component of the pixels representing the relatively large area to identify a lowest color value of the common color component that exceeds a threshold color value.

4. A method of printing a multi-color image on a particular surface, using a digital image file having a discrete number of pixels that collectively represent the multi-color image, said method comprising:

reviewing the digital image file pixel-by-pixel, including a consideration of respective color values of various color components used to print the multi-colored image, to determine which color component is dominant in each pixel, in order to identify the most prevalent color component used to print the multi-color image;

interrogating the color values of the most prevalent color component pixel-by-pixel to identify a lowest color value of the most prevalent color component that exceeds a threshold color value;

identifying each pixel that has the most prevalent color component, but with a color value of that color component that is greater than or equal to the identified lowest color value, to determine a relatively large area of the multi-color image that corresponds to the identified pixels;

forming an outline of the determined relatively large image area on the particular surface the multi-colored image is to be printed;

applying a colored receiver having the identified lowest color value of the prevalent color component within the formed outline on the particular surface, to provide a colored receiver layer within the formed outline that has the same color as the most prevalent color component;

applying a non-colored receiver to an area on the particular surface that is outside the formed outline on the particular surface, to provide a non-colored receiver layer on the particular surface in addition to the colored receiver layer on the particular surface;

modifying the digital image file by subtracting the identified lowest color value of the most prevalent color component from the identified pixels that determine the relatively large area, to provide a printing file for printing the multi-color image; and printing the multi-color image on the colored and non-colored receiver layers, using the printing file, to make a print of the multi-color image on the particular surface.

5. A method as recited in claim 4, wherein the step of forming the outline of the determined relatively large image area on the particular surface includes determining the X, Y coordinates of each pixel.

* * * * *